United States Patent
Boldt

(10) Patent No.: US 7,220,786 B1
(45) Date of Patent: *May 22, 2007

(54) ULTRAVIOLET RADIATION CURABLE COATING FOR MLS HEAD GASKET APPLICATIONS

(75) Inventor: Brent R. Boldt, Bartlett Cook, IL (US)

(73) Assignee: Dana Corporation, Toledo, OH (US)

( * ) Notice: Subject to any disclaimer, the term of this patent is extended or adjusted under 35 U.S.C. 154(b) by 550 days.

This patent is subject to a terminal disclaimer.

(21) Appl. No.: 10/230,813

(22) Filed: Aug. 29, 2002

Related U.S. Application Data

(63) Continuation-in-part of application No. 09/644,316, filed on Aug. 23, 2000, now abandoned.

(51) Int. Cl.
- C08F 2/50 (2006.01)
- C08L 33/04 (2006.01)
- C09J 133/04 (2006.01)

(52) U.S. Cl. .................. 522/8; 52/91; 52/92; 52/96

(58) Field of Classification Search .............. 522/92, 522/91, 8, 96
See application file for complete search history.

(56) References Cited

U.S. PATENT DOCUMENTS

| | | |
|---|---|---|
| 4,220,342 A | 9/1980 | Shah |
| 4,271,258 A | 6/1981 | Watariguchi |
| 4,355,078 A | 10/1982 | Kaufman |
| 4,533,445 A | 8/1985 | Orio |
| 4,609,686 A | 9/1986 | Giordano, Jr. et al. |
| 4,732,637 A | 3/1988 | Dettling et al. |
| 4,849,048 A | 7/1989 | Inagaki et al. |
| 5,128,387 A * | 7/1992 | Shustack ............ 522/92 |
| 5,128,391 A * | 7/1992 | Shustack ............ 522/92 |
| 5,146,531 A | 9/1992 | Stustack |
| 5,176,966 A | 1/1993 | Epp et al. |
| 5,510,152 A | 4/1996 | Boldt |
| 5,536,758 A | 7/1996 | Boldt |
| 5,631,049 A | 5/1997 | Boldt |
| 5,667,227 A | 9/1997 | Boldt |
| 5,754,338 A | 5/1998 | Wilson et al. |
| 5,882,796 A | 3/1999 | Wilson et al. |
| 5,888,649 A | 3/1999 | Curatolo et al. |
| 5,891,530 A | 4/1999 | Wright |
| 5,910,858 A | 6/1999 | Frey et al. |
| 5,945,463 A * | 8/1999 | Kawabuchi et al. ........ 522/96 |
| 6,025,114 A | 2/2000 | Popat et al. |
| 6,057,054 A | 5/2000 | Barton et al. |
| 6,156,816 A | 12/2000 | Saint Victor |
| 6,730,363 B1 * | 5/2004 | Shah et al. ............. 427/508 |
| 6,824,874 B1 * | 11/2004 | Shah et al. ............. 428/413 |
| 2004/0044122 A1 | 3/2004 | Boldt |

FOREIGN PATENT DOCUMENTS

| | | |
|---|---|---|
| DE | 19829142 A1 | 1/2000 |
| EP | 0385779 A1 | 9/1990 |
| EP | 0902040 A1 | 3/1999 |
| EP | 1009052 A1 | 6/2000 |
| WO | WO96/28396 | 9/1996 |
| WO | WO-02/17422 A2 | 2/2002 |

OTHER PUBLICATIONS

Delphion English Abstracts for DE19829142A1.
Delphion English Abstract for EP0902040 A.
International Search Report dated Dec. 10, 2004 (2 pages).

* cited by examiner

*Primary Examiner*—Susan Berman
(74) *Attorney, Agent, or Firm*—Marshall & Melhorn, LLC

(57) ABSTRACT

Compositions and methods for coating surfaces of MLS gasket layers are disclosed. The process includes applying a coating precursor on at least one surface of one or more of the layers, and curing the coating precursor by exposure to radiation. Disclosed coating precursors include those containing an acrylated oligomer and a photoinitiator, which can polymerize in response to ultraviolet or electron beam radiation.

12 Claims, 1 Drawing Sheet

ULTRAVIOLET RADIATION CURABLE COATING FOR MLS HEAD GASKET APPLICATIONS

CROSS-REFERENCE TO RELATED APPLICATION

This application is a continuation-in-part of Ser. No. 09/644,316, filed Aug. 23, 2000 now abandoned, which is herein incorporated by reference in its entirety.

BACKGROUND OF THE INVENTION

1. Field of the Invention

The present invention relates to reactive coating compositions for insulating and sealing surfaces, and more particularly, to coating compositions for sealing component layers of MLS gaskets used in internal combustion engines.

2. Discussion

A recurring challenge faced by designers of internal combustion engines is to maintain a gas-tight seal between the engine block and the cylinder head. In recent years, advances in gasket design—notably the introduction of multiple-layered steel (MLS) gaskets—have helped reduce sealing problems associated with the interface between the cylinder head and the engine block.

Conventional MLS gaskets typically comprise an interior layer that is sandwiched between a pair of exterior layers. The exterior layers are often made of 301 stainless steel, which is a comparatively strong metal having a high spring rate. The interior layer, which is also called a "spacer" layer, is normally made of less expensive materials, such as 409 stainless steel, or in some cases, zinc-plated steel or other low carbon steels.

Like other cylinder head gaskets, MLS gaskets include a number of apertures that extend between the exterior layers. When installed between the cylinder head and the engine block, the apertures circumscribe cylinder bores (i.e., combustion apertures), boltholes, coolant ports and oil ports. During engine operation, regions of the gasket adjacent to the cylinder bores are subject to greater stresses than portions of the gasket spaced further away from the combustion apertures. To compensate for the greater stresses, MLS gaskets generally include stopper layers, which surround each of the combustion apertures.

When compared to other regions of the MLS gasket, the stopper layers provide comparatively higher sealing pressure around the portions of the gasket that border the combustion apertures. In some cases the stopper layers comprise additional layers of metal, which are folded over or under the primary sealing layers (i.e., exterior layers or spacer layer). In other cases, the stopper layers comprise discrete annular rings positioned about the boundaries of the combustion apertures.

Most MLS gaskets also include secondary seals that, relative to the combustion apertures, are located radially outward of the stopper layer. Each of the secondary seals generally comprises an active spring seal that is defined by embossed beads on the external sealing layers. The embossed beads are normally arranged in pairs, so that a bead on one of the exterior layers has a corresponding bead on the opposing exterior layer.

MLS gaskets may also include a coating layer formed on sealing surfaces of one or more of the gasket layers. The coating layer helps improve the seal between the engine cylinder head and block. The coating layer is typically made of thermosetting polymers, such as nitrile butadiene rubber (NBR), fluorinated rubbers, and the like, which may be compounded with fillers, plasticizers, antioxidants and other materials that modify the properties and performance of the coating layer.

Though useful, conventional coatings used on MLS gaskets can be improved. For example, processes used to coat MLS gaskets are capital and energy intensive, requiring a large convection oven to cross-link (or cure) the coating precursors. Additionally, many existing coating formulations use volatile solvents, which present environmental challenges and add to the cost of the coating. Some coating systems also use primer and anti-stick coatings, which help the coating adhere to the surface of the metal gasket layers while permitting adjacent gasket layers to move relative to one another. However, the additional coating layers add to the cost and complexity of the coating process.

The present invention helps overcome, or at least mitigate one or more of the problems described above.

SUMMARY OF THE INVENTION

The present invention provides ultraviolet (UV) radiation curable coatings for sealing MLS gaskets. Ultraviolet radiation curable coatings offer certain advantages over conventional thermosetting coatings. For example, processes employing UV curable coatings are less capital and energy intensive than processes used to apply and cure conventional thermosetting polymers. Additionally, the UV curable coatings of the present invention do not use volatile solvents, primer coatings or anti-stick coatings, which results in simpler and less costly coating processes than conventional coating systems. Furthermore, once cured, the UV curable coatings combine good chemical resistance with excellent mechanical properties.

Thus, one aspect of the present invention provides a process for coating an MLS gasket, which is comprised of an interior metal layer sandwiched between a pair of exterior metal layers. The process includes providing one or more of the metal layers, each having first and second surfaces, and applying a coating precursor on at least the first surface of the one or more metal layers. Since the coating precursor is capable of polymerizing (curing) in response to radiation, the method also includes exposing the coating precursor on the metal layer to radiation to initiate polymerization. Useful coating precursors include those that can polymerize in response to ultraviolet radiation. Such coating precursors include those that contain an acrylated oligomer and a photoinitiator.

Another aspect of the present invention provides an MLS gasket comprised of an interior metal layer sandwiched between a pair of exterior metal layers, each of the metal layers having first and second surfaces and a coating precursor applied to at least one of the first and second surfaces of one or more of the metal layers. The coating precursor is generally an acrylate resin made up of an acrylated aliphatic urethane oligomer, an acrylated epoxy oligomer, a mono-functional monomer for reducing viscosity of the coating precursor, a multi-functional monomer for increasing cross-link density, an adhesion promoter, and a photoinitiator.

Still another aspect of the present invention provides an ultraviolet radiation or electron beam-curable coating precursor for coating an MLS gasket. The coating precursor includes an acrylated aliphatic urethane oligomer, an acrylated epoxy oligomer, a mono-functional monomer, a multi-functional monomer, an adhesion promoter, and a photoinitiator. A particular useful coating precursor includes from about 25 wt. % to about 65 wt. % of the acrylated aliphatic urethane oligomer; from about 5 wt. % to about 20 wt. % of the acrylated epoxy oligomer; from about 20 wt. % to about 40 wt. % of the mono-functional monomer; from about 1 wt. % to about 5 wt. % of the multi-functional monomer; from about 1 wt. % to about 15 wt. % of the adhesion promoter; and from about 0.1 wt. % to about 10 wt. % of the photoinitiator.

DETAILED DESCRIPTION

The present invention generally comprises compositions for sealing mating surfaces of manufactured parts. The coatings are typically used as a barrier against fluid transport in many different products, including trucks, off-road and automotive gaskets. Although described in relation to an MLS cylinder head gasket, the disclosed coating precursors can be used to seal other types of automotive gaskets.

Figure 1:
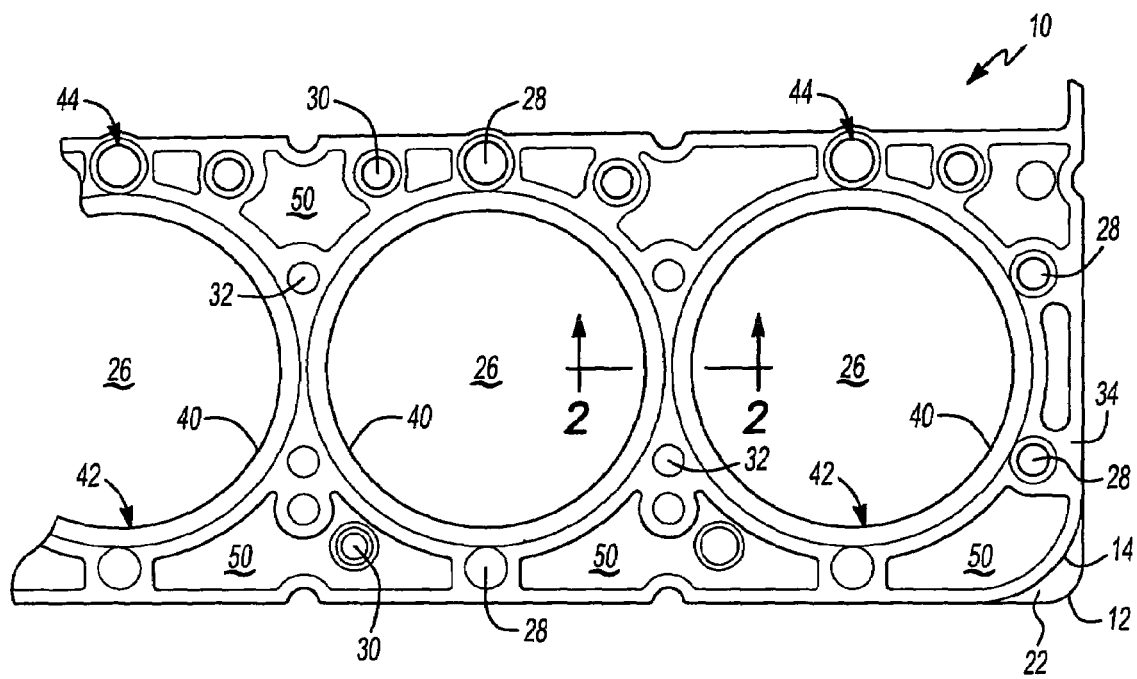
FIG. 1 is a sketch of top view of a portion of an MLS gasket (not to scale).
Figure 2:
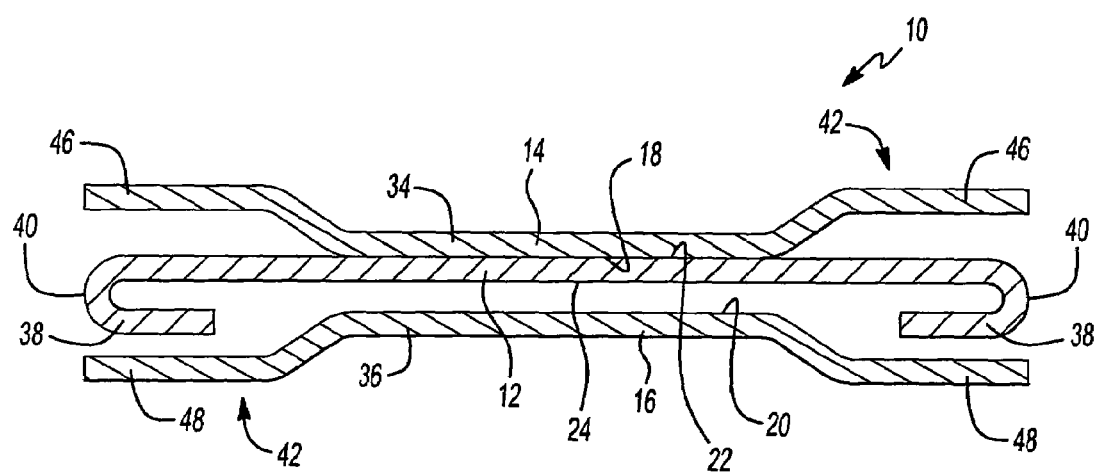
FIG. 2 is a cross-sectional view through line 2—2 of the MLS gasket shown in FIG. 1.

FIG. 1 and. FIG. 2 show, respectively, a top view of an MLS gasket 10 and a cross-sectional view of the MLS gasket 10 through viewing line 2—2. The MLS gasket 10 includes an interior metal layer 12, which is disposed between first 14 and second 16 exterior metal layers. For clarity, FIG. 2 shows the metal layers 12, 14, 16 as being spaced apart from one another. However, when the MLS gasket 10 is installed between an engine cylinder head and block (not shown), inward-facing (first) surfaces 18, 20 of the pair of exterior metal layers 14, 16 abut outward-facing, first 22 and second 24 surfaces of the interior metal layer 12. As noted above, the exterior layers 14, 16 are often made of 301 stainless steel, which is a comparatively strong metal having a high spring rate. The interior layer 12, which is also called a "spacer" layer, is normally made of less expensive materials, such as 409 stainless steel, or in some cases, zinc-plated steel or other low carbon steels. The MLS gasket 10 depicted in FIG. 1 and FIG. 2 has three metal layers, though other embodiments may have more than three layers.

The MLS gasket 10 includes sets of apertures 26, 28, 30, 32 which extend between the outward-facing (second) surfaces 34, 36 of the exterior metal layers 14, 16. One set of apertures 26 circumscribes the combustion cylinders (not shown) of the engine. Another set of apertures 28 provides clearances for threaded fasteners (e.g., bolts) that attach the MLS gasket 10 to the engine block and cylinder head. Other sets of apertures 30, 32 provide passageways for engine coolant, oil, etc.

As noted above, regions of the MLS gasket 10 adjacent to the cylinder bores are subject to greater stresses than portions of the gasket 10 spaced further away from the combustion apertures 26 during engine operation. To compensate for the greater stresses, the MLS gasket 10 includes a stopper layer 38, which surrounds each of the combustion apertures 26. When compared to other regions of the MLS gasket 10, the stopper layer 38 provides comparatively higher sealing pressure around the portions of the gasket 10 that border the combustion apertures 26. As shown in FIG. 2, the stopper layer 38 comprises an additional layer of metal that is formed by folding an edge 40 of the interior layer 12 under the primary sealing layers (i.e., exterior layers 14, 16). In other embodiments, the stopper layer 38 may comprise discrete annular rings positioned about the boundaries of the combustion apertures 26.

The MLS gasket 10 also includes secondary seals 42, 44 that, relative to the combustion apertures 26, are located radially outward of the stopper layer 38. Each of the secondary seals 42, 44 comprises an active spring seal that is defined by embossed beads 46, 48 on the external metal layers 14, 16. The embossed beads 46, 48 are arranged in pairs, so that a bead 46 on one of the exterior layers 14 has a corresponding bead 48 on the opposing exterior layer 16.

One or more of the metal layers 12, 14, 16 includes a resilient coating 50, which is applied on either or both of the first 18, 20, 22 and second surfaces 34, 36, 24 of the layers 12, 14, 16. As noted above, the coating 50 helps seal against the undesired leakage of various fluids, including combustion gases, oil, and coolant from the apertures 26, 28, 30, 32 extending through the MLS gasket 10. In order to provide an affective seal, the coating 50 is chemically resistant to the fluids it encounters, is thermally stable at engine operating temperatures, and exhibits good adhesion to the layers 12, 14, 16. The thickness and mechanical properties of the coating 50 will depend on the dimensions and properties of the layers 12, 14, 16, but is typically about 2µ to 50µ and more preferably approximately 5µ to 25µ thick, has a tensile strength greater than about 500 psi, an elongation greater than about 100 percent, and a Shore A hardness between about 45 and about 85.

The coating 50, which is applied on the layers 12, 14, 16 in a fluid state and then solidified in situ, comprises a blend of one or reactive coating precursors that are subsequently polymerized and/or cross-linked. Here, "reactive" means that the components of the coating 50 react with one another or self-react to cure (solidify); such materials are also referred to as thermosetting resins. Depending on the type of reactive components employed, the coating 50 can be cross-linked and/or polymerized using any number of mechanisms, including oxidative curing, moisture curing, thermal curing, high energy radiation curing (e.g., ultraviolet curing, electron beam curing), condensation and addition polymerization, and the like.

Each of the disclosed reactive coating precursors can be applied using coating techniques known to persons of ordinary skill in the art, including roller coating, dipping, brushing, spraying, stenciling, silk screen printing, and the like. However, of these coating techniques, silk screen printing is preferred because of its low cost, speed, and accuracy. The coating precursors may be applied as a cover-all coating or in a selected continuous or discontinuous pattern depending on the sealing requirements of the application.

Useful reactive precursors include, but are not limited to acrylate resins such as acrylated urethanes, vinyl acrylates, acrylated epoxies, acrylated polyesters, acrylated acrylics, acrylated polyethers, acrylated olefins, acrylated oils, and acrylated silicones. These reactive precursors can be cured using mechanisms described above, typically in less than 45 minutes. Rapidly acting forms of radiation, which require application for less than about 30 seconds and preferably for less than about 5 seconds are particularly useful. Useful forms of radiation include ultraviolet (UV) radiation, infrared radiation, microwave radiation, and electron beam radiation. Depending on the particular curing mechanism, the coating 50 precursor can include a catalyst, an initiator, or curing agent to help initiate and/or accelerate curing. Note that in this disclosure "resins" or "resin systems" refer to polydisperse systems containing monomers, oligomers, polymers, or combinations thereof.

Exposing the coating precursor to high-energy radiation represents a particular useful method of polymerizing the reactive components in coating precursors, offering additional advantages for MLS gasket 10 coatings 50 over thermally-cured reactive coating precursors. For instance, radiation cured coating precursors can be cross-linked at much lower temperatures (e.g., ambient temperature) than heat-cured reactive coating precursors. Radiation curing can proceed via at least two mechanisms. In a first mechanism, radiation provides fast and controlled generation of highly reactive species (free radicals) that initiate polymerization of unsaturated materials. In a second mechanism, radiation (UV/electron beam) activates certain cationic photoinitiators that decompose to yield an acid catalyst that propagates the cross-linking reaction.

Examples of reactive precursors that can be cured using high-energy radiation (ultraviolet, electron beam, and so on) include, but are not limited to the acrylate resins. These reactive precursors include acrylates and methacrylates, and can be monomers or oligomers (i.e., moderately low molecular weight polymers typically containing 2–100 monomer units, and often 2–20 monomer units) of varying molecular weight (e.g., 100–2000 weight average molecular weight). Useful reactive coating precursors include, but are not limited to acrylated urethanes, acrylated epoxies, acrylated olefins, and mixtures thereof. The acrylate resins typically comprise from about 30 wt. % to about 80 wt. % of the coating precursor, and preferably comprise from about 45 wt. % to about 60 wt. % of the coating precursor.

Acrylated urethanes are diacrylate esters of hydroxy terminated NCO extended polyesters or polyethers. They can be aliphatic or aromatic, although acrylated aliphatic urethanes are generally more useful in MLS gasket 10 applications because they are less susceptible to attack by the heat transfer fluids and because they appear to provide better mechanical properties (tensile, elongation, hardness). The acrylated urethane provides the "backbone" of the cured coating, and therefore is usually present in the highest concentration, though too high a concentration may result in an unacceptably soft coating exhibiting insufficient thermal and chemical resistance.

The acrylated urethanes typically comprise from about 25 wt. % to about 65 wt. % of the coating precursor, and preferably comprise from about 40 wt. % to about 47 wt. % of the coating precursor. Examples of useful acrylated urethanes include those commercially available from Henkel Corp. under the trade name PHOTOMER (e.g., PHOTOMER 6010) and from UCB Radcure Inc. under the trade names EBECRYL (e.g., EBECRYL 220, 284, 4827, 4830, 6602, 8400 and 8402), RXO (e.g., RXO 1336), and RSX (e.g., RSX 3604, 89359, 92576). Other useful acrylated urethanes are commercially available from Sartomer Co. under the trade name SARTOMER (e.g., SARTOMER 9635, 9645, 9655, 963-B80, and 966-A80), and from Morton International under the trade name UVITHANE (e.g., UVITHANE 782).

Acrylated epoxies are diacrylate esters of epoxy resins, such as the diacrylate esters of bisphenol A epoxy resin, and include epoxy resins having a pendent nitrile moiety. Acrylated epoxy resins generally improve the thermal stability and chemical resistance of the MLS gasket 10 coating 50, and increase its tensile strength. However, including an excessive amount of an acrylated epoxy may degrade the coating's adhesion to the layers 12, 14, 16 and may also adversely impact its ability to seal. The acrylated epoxies typically comprise from about 5 wt. % to about 20 wt. % of the coating precursor, and preferably comprise from about 8 wt. % to about 13 wt. % of the coating precursor. Examples of useful acrylated epoxies include those commercially available from UCB Radcure Inc. under the EBECRYL and RXO trade names (e.g., EBECRYL 600, 629, 860 and 3708, RXO 2034) and from Henkel Corp. under the PHOTOMER trade name (e.g., PHOTOMER 3016, 3038 and 3071).

Acrylated acrylics are acrylic oligomers or polymers that have reactive pendant or terminal acrylic acid groups capable of forming free radicals for subsequent reaction, and include acrylic resins having a pendant nitrile moiety. Like the acrylated epoxies, the acrylated acrylics (especially those having pendant nitrile groups) generally improve the thermal stability of the MLS gasket 10 coating 50 and increase its tensile strength. The acrylated acrylics typically can comprise from about 0 wt. % to about 25 wt. % of the coating precursor, and preferably comprise from about 0 wt. % to about 13 wt. % of the coating precursor. Examples of useful acrylated acrylics are those commercially available from UCB Radcure under the EBECRYL trade name (e.g., EBECRYL 745, 754, 767, 1701, and 1755), from Sartomer Co. under the trade designation NTX4887 (a fluoro-modified acrylic oligomer), and from B.F. Goodrich under the trade name HYCAR (e.g., HYCAR 130X43).

Similarly, acrylated olefins are unsaturated oligomeric or polymeric materials having reactive pendant or terminal acrylic acid groups capable of forming free radicals for cross-linking or chain extension. Like the acrylated epoxies and acrylics, the acrylated olefins generally improve the thermal stability of the MLS gasket 10 coating 50 and increase its tensile strength. The acrylated olefins typically can comprise from about 0 wt. % to about 20 wt. % of the coating precursor, and preferably comprise from about 0 wt. % to about 13 wt. % of the coating precursor. Examples of useful acrylated olefins include polybutadiene acrylic oligomers, which are commercially available from Sartomer Co. under the trade name SARTOMER CN302, and from Ricon Resins under the trade name FX9005.

The reactive precursors ordinarily include a reactive diluent for controlling viscosity, for increasing cross-link density, and for promoting adhesion. The reactive diluent includes at least one mono- or multi-functional monomer. Here, "mono-functional" refers to a compound that contains one carbon—carbon double bond, and multi-functional refers to a compound that contains more than one carbon—carbon double bond or another chemically reactive group that can cross-link. Reactive diluents are generally acrylate monomers, although non-acrylates such as n-vinyl pyrrolidone, limonene, and limonene oxide, can also be used, as long as the monomers are ethylenically unsaturated.

The mono-functional monomers decrease the viscosity of the coating 50 precursor without substantially degrading the properties of the coating 50. Used in proper proportions, the mono-functional monomers can, in some cases, improve bulk mechanical properties (adhesion, tensile strength, elongation) as well. The mono-functional monomers typically comprise from about 20 wt. % to about 40 wt. % of the coating precursor, and preferably comprise from about 25 wt. % to about 35 wt. % of the coating precursor. Examples of useful mono-functional monomers include, but are not limited to ethyl acrylate, methyl methacrylate, isooctyl acrylate, oxethylated phenol acrylate, 2-ethylhexyl acrylate, 2-phenoxyethyl acrylate, 2-(ethoxyethoxy)ethyl acrylate, ethylene glycol methacrylate, tetrahydroxy furfuryl acrylate, caprolactone acrylate, and methoxy tripropylene glycol monoacrylate. Particularly useful mono-functional monomers include isobornyl acrylate monomer and octyldecyl acrylate monomer, which are available from UCB Radcure under the trade names IBOA and ODA, respectively.

Like mono-functional monomers, multi-functional monomers decrease the viscosity of the coating precursor, but also accelerate the rate of cure, and increase the cross-link density, which improves chemical resistance and increases tensile strength while decreasing elongation. Since the multi-functional monomers increase cross-link density, they are useful at lower concentrations than the mono-functional monomers, typically comprising from about 1 wt. % to about 5 wt. % of the coating precursor, and preferably comprising from about 2 wt. % to about 4 wt. % of the coating precursor. Examples of useful multi-functional monomers include, but are not limited to triethylene glycol diacrylate, methoxyethyoxylated trimethylpropane diacrylate, pentaerythritol triacrylate, glycerol triacrylate, glycerol trimethacrylate, trimethylolpropane propoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, tetraethylene glycol diacrylate, polyethylene glycol diacrylate, pentaerythritol tetraacrylate, pentaerythritol tetramethacrylate, and 1,6-hexane diacrylate. Other mono- and multi-functional monomers include vinyl acetate, n-vinyl formamide, limonene oxide, and n-vinyl pyrrolidinone. Particularly useful multi-functional monomers include propoxylated glycerol triacrylate monomer and trimethylolpropane ethoxy triacrylate monomer, which are available from UCB Radcure under the trade names OTA-480, and TMP-EOTA, respectively.

The adhesion promoter includes at least one radiation curable material, such as mono- or multi-functional monomers or oligomers. One particularly useful adhesion promoter is a methacrylated polyol adhesion promoter available from UCB Radcure under the trade name EBECRYL 168. Typically, the adhesion promoter comprises from about 1 wt. % to about 15 wt. % of the coating precursor, and preferably comprises from about 7 wt. % to about 11 wt. % of the coating precursor. Most of the disclosed reactive mono-functional and multi-functional acrylate monomers are commercially available from UCB Radcure under the EBECRYL trade name, from Henkel Corp. under the PHOTOMER trade name, and from Sartomer Co. under the SARTOMER trade name.

Ordinarily, the reactive precursor includes at least one mono-functional monomer, at least one multi-functional monomer, and at least one multi-functional oligomer. Typically, the reactive precursors include mono-functional and multi-functional acrylated monomers having molecular weights no greater than about 1000 (usually between about 100–1000) and a multi-functional oligomeric acrylated urethane having a weight average molecular weight of at least about 500, but generally between about 500–7000. As indicated above, increasing the fraction of mono-functional monomers tends to lower the viscosity of the coating precursor blend and improve wet-out on the surfaces the layers 12, 14, 16. Furthermore, increasing the fraction of multi-functional monomers and oligomers (e.g., diacrylates and triacrylates) tends to increase cross-linking, resulting in stronger adhesion, higher tensile strength, improved chemical resistance, but lower elongation.

The coating precursor normally includes one or more photoinitiators when it is cross-linked or polymerized with ultraviolet radiation. Examples of photopolymerization initiators (photoinitiators) include, but are not limited to organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone-tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4 (methylthio), phenyl-2-morpholino-1-propanone, bis(2,6-dimethoxybenzoyl)(2,4,4-trimethylpentyl)phosphine oxide, and so on.

The amount of the photoinitiators should be sufficient to generate the desired rate of curing and to produce the requisite coating properties and typically comprises from about 0.1 wt. % to about 10 wt. % of the coating precursor, and preferably comprises from about 1 wt. % to about 8 wt. %. A particularly useful blend of photoinitiators comprises from about 1 wt. % to about 4 wt. % benzophenone and from about 1.5 wt. % to about 5 wt. % of 1-phenyl-2-hydroxy-2-methyl-1-propanone of the coating precursor. Benzophenone is commercially available from Sartomer Co., and the propanone is commercially available from Ciba-Geigy Corp. under the trade name of DAROCUR 1173.

The coating precursors may contain additives such as fillers, pigments (typically on the order of 0 to approximately 1% by weight), defoamers, flattening agents, wetting agents, slip aids, stabilizers, plasticizers, air-release agents, and the like. The additives can be reactive or non-reactive, but are typically non-reactive. Examples of useful non-reactive air-release agents include polydimethyl siloxanes, such as various DC-series silicone oils commercially available from Dow Corning, and SAG 47, which is commercially available from OSI Specialties. Typically, such additives (including air-release agents) are used in amounts necessary to achieve the requisite coating characteristics, and each generally comprises up to about 5 wt. % of the total weight of coating precursor.

In addition, the coating precursors may also contain various solvents other than the reactive diluent monomers to help dissolve or swell the higher molecular weight reactive resins (e.g., the acrylated oligomers). Such solvents are referred to as non-reactive diluents or non-reactive monomers because they do not significantly polymerize or cross-link with the reactive resin components. Useful solvents include ketone solvents, tetrahydrofuran, xylene, and the like, although preferably the coating precursors contain no solvents. The coating may also contain colorants (i.e., pigments and dyes). Potential acceptable colorants include $TiO_2$, phthalocyanine blue, phthalocyanine green, carbon black, basic carbonate white lead, zinc oxide, zinc sulfide, antimony oxide, zirconium oxide, lead sulfochromate, bismuth vanadate, bismuth molybdate, iron oxide magnetite, $Fe_3O_4$, and iron (III) oxide, $Fe_2O_3$, among others. Pigments can comprises from 0 wt. % to about 5 wt. % of the coating precursor and in one embodiment approximately 1 wt. %.

As noted above, the acrylate resins are typically cured using radiation such as ultraviolet light. Following application of the coating precursor, the MLS gasket 10 layers 12, 14, 16 are placed on a conveyer that transports the layers (or plates) under one or more sets of ultraviolet lamps, resulting in successive in-line exposure of the coating precursor to ultraviolet radiation. The sets of ultraviolet lamps have nominal radiant wavelengths that are the same or different. The length of exposure is controlled by the conveyor speed, which is typically in the range of 10 to 40 feet per minute and results in exposure times in the range of about 0.5 to about 5 seconds for each set of lamps. The UV lamps typically have power ratings from about 300 to about 600 watts per linear inch. Useful UV lamps include those employing type D, type V, type H, or type H+ bulbs, which are commercially available from Fusion UV Curing Systems and have nominal wavelengths of 375 nm, 425 nm, 250 nm, and 220 nm, respectively. Other useful UV lamps include arc-type UV lamps having a mercury spectrum similar to Fusion type H bulbs.

One useful curing process employs two sets of arc-type UV lamps or UV lamps having type H bulbs. Another useful curing process uses a first set of UV lamps having type D bulbs (longer wavelength UV light), and a second set of UV lamps having type H or H+ bulbs (shorter wavelength UV light). Although not bound to any particular theory, it is believed that an initial exposure to UV lamps having type D bulbs cures the interior portions of the coating layer and adheres the coating to the surfaces of the plates 12, 14, 16. Subsequent exposure to UV lamps having type H or H+ bulbs cures the outer portions of the coating layer. While the two-step curing process produces a satisfactory coating, curing under an inert nitrogen atmosphere may enhance coating 50 properties. A flow rate of 20 cubic feet per minute of nitrogen through the curing equipment has been found in some instances to improve surface curing.

Application of Coating Precursors

Each of the disclosed reactive coating precursors can be applied using coating techniques known to persons of ordinary skill in the art, including roller coating, dipping, brushing, spraying, stenciling, screen printing, and the like. However, of these coating techniques, screen printing is preferred because of its low cost, speed, and accuracy. The coating precursors may be applied to one or both sides of the MLS gasket 10 layers 12, 14, 16 and as a cover-all coating or, as depicted in FIG. 1, in selected continuous or discontinuous patterns depending on the sealing requirements of the MLS gasket 12. As noted above, the coating thickness typically ranges from about 2μ to 50μ and more preferably approximately 5μ to about 25μ.

EXAMPLES

The following examples are intended as illustrative and non-limiting, and represent specific embodiments of the present invention.

Examples A–P

Acrylate Resin Coatings

Table 1 lists coating precursor compositions (formulations A–Q) for insulating and sealing one or more layers of an MLS gasket. Each of the compositions includes an acrylated aliphatic or aromatic urethane oligomer, an isobornyl acrylate mono-functional monomer, a pair of photoinitiators (1-phenyl-2-hydroxy-2-methyl-1-propanone and benzophenone), and a polydimethylsiloxane air-release agent. In addition, all of the formulations include a multi-functional monomer—either propoxylated glycerol triacrylate (formulations A–I, K–O, Q) or trimethylolpropane ethoxy triacrylate monomer (formulations J, P). Some of the formulations also include an acrylated olefinic oligomer (formulations B–E, G, I, L–O), an acrylated epoxy oligomer (formulations B, C, E, F, H–O, Q), an acrylated epoxy monomer (formulation O), a methacrylated polyol adhesion promoter (formulations A–D, F–H, J–O, Q), or an octyldecyl mono-functional monomer (formulation O).

The formulations listed in Table 1 were prepared by introducing the urethane oligomers and the polydimethylsiloxane air-release agent in a vessel. The mixture was stirred with heating to lower the viscosity of the mixture. The methacrylated polyol adhesion promoter (if present) was then added to the mixture. Once the adhesion promoter was fully dispersed, the non-urethane oligomers, and the mono-functional monomers (isobornyl acrylate and octydecyl acrylate monomer) were added (in order). In a separate vessel, benzophenone was dissolved in 1-phenyl-2-hydroxy-2-methyl-1-propanone and in the multi-functional monomers with heating. The resulting blend of photoinitiators and multi-functional monomers were then admixed with the other coating precursor components.

Test samples were prepared on various substrates by screen printing (110 mesh polyester screen, nominal 0.001-inch and 0.005 inch pad heights) or by casting (fixed clearance draw down knife). Depending on the test, the nominal coating thickness was 0.001 inches (adhesion, mandrel flex, coolant blisters) or 0.005–0.006 inches (tensile strength, elongation, Shore A hardness). However, the coating thickness of adhesion test samples of formulations H and P was 0.005–006 inches. Each of the example formulations was cured by successive exposure to 375 watts/inch UV lamps having Fusion type D bulbs (375 nm) and type H+ bulbs (220 nm), respectively, at line speeds of 15–25 feet per minute. The test samples were used to measure various properties, including tensile strength, elongation, Shore A hardness, adhesion (scratch, blistering), and temperature resistance (mandrel flex).

Table 1 lists scratch adhesion results for test samples immersed in a fuel cell coolant (formulations H, P, Q), automotive coolant (A–Q), or automotive oil (formulations J, K). Test samples of formulation H and Q were immersed in three different heat transfer fluids at ambient temperature for 70 hours. The heat transfer fluids used were an isoparaffinic fluid commercially available from Solutia Inc. under the trade name THERMINOL D12, a proprietary fluid commercially available from Dynalene Heat Transfer Fluids under the trade name DYNALENE FC-1, and a fluorinated hydrocarbon fluid commercially available from 3M under the trade name PF-5080.

Test samples of formulations A–P were immersed in a 50:50 by weight ($W_T/W_T$) mixture of GM LONG LIFE COOLANT and water for 72 hours at 100° C.; test samples J and K were immersed in ASTM IRM 903 oil for 72 hours at 150° C. Following immersion, adhesion was measured using a RPM 516 scratch test method. In accordance with the test method, a coated substrate was secured on a translatable stage and a "needle" was lowered onto the surface of the coated substrate. During the test, a 500-gram dead weight load was applied to one end of the needle so that the other end of the needle penetrated the coating. The needle executed a circular motion while the specimen was translated at a rate of about 2.5 mm/cycle, producing a series of 10-mm diameter, overlapping circular scratch marks in the coating. The appearance of the coating was ranked on a scale of 1 (poor adhesion) to 10 (best adhesion). Each of the entries in Table 1 represents the average of three test samples per fluid; the designation "dry" refers to test samples that were not immersed in coolant or oil prior to the scratch test.

Table 1 also lists tensile strength, elongation, and Shore A hardness for each of the coating formulations. To measure tensile strength and elongation, 1 inch by 4 inch specimens were die-cut from samples that were cast on polyester film using a fixed clearance draw down knife. The sample thickness was measured at multiple points on the film (minimum of six places near the center of the specimen), and the samples were pulled at ambient temperature on an Instron tester at a crosshead speed of 0.2 inches per minute.

For each formulation, Table 1 reports average tensile strength and elongation at break based on five samples. To measure Shore A hardness, 0.5 inch by 1.5 inch specimens were cut from samples cast on polyester film. Specimens from a single formulation were stacked to obtain an overall sample thickness of 0.125 inches. The hardness of the "stacked" test sample was measured using a table-mounted Shore A hardness tester. Five hardness measurements were obtained for each formulation.

Table 1 also lists temperature resistance data (denoted "temperature mandrel") and viscosity data. Temperature resistance was measured using a modified version of ASTM D573. Each test specimen (screen-printed coating on a 0.008 inch thick stainless steel coupon) was heat aged for 22 hours at 185° C., bent around a 6-inch diameter mandrel, and then visually inspected for cracks in the coating or for loss of bond between the coupon and the coating. The appearance of the coating was ranked on a scale of 1 (many cracks, loss of bond) to 10 (few or no cracks, little or no loss of bond); data in Table 1 represent the average of three test specimens. The viscosity entries are based on a subjective assessment of the flow characteristics of the coating precursor. A ranking of 1 indicates the coating precursor would be difficult to screen print, and a ranking of 10 indicates that the coating precursor would be easy to screen print.

TABLE 1

| Acrylate Resin Coating Precursors (wt. %) | | | | | | |
|---|---|---|---|---|---|---|
| | A | B | C | D | E | F |
| Acrylated Aliphatic Urethane Oligomer | | | | | | |
| RXO 1336 | 37.2 | 25.7 | 19.7 | 36.7 | 32.0 | 34.2 |
| Acrylated Aromatic Urethane Oligomer | | | | | | |
| RSX 89359 | — | — | — | — | — | — |
| EBECRYL 4827 | — | — | — | — | — | — |
| Acrylated Olefinic Oligomer | | | | | | |
| CN 302 | — | 12.9 | 19.7 | 12.2 | 21.3 | — |
| FX 9005 | — | — | — | — | — | — |
| Acrylated Acrylic Oligomer | | | | | | |
| NTX 4887 (fluoro-modified) | — | — | — | — | — | — |
| Acrylated Epoxy Oligomer | | | | | | |
| EBECRYL 3708 | — | 12.9 | 19.7 | — | 10.7 | 22.8 |
| Acrylated Epoxy Monomer + Oligomer | | | | | | |
| RXO 2034 | — | — | — | — | — | — |
| Methacrylated Polyol | | | | | | |
| EBECRYL 168 | — | 5.1 | 7.9 | 9.8 | — | 4.6 |
| Isobornyl Acrylate Monomer | | | | | | |
| IBOA | 49.6 | 34.3 | 26.2 | 32.6 | 28.4 | 30.4 |
| Trimethylolpropane Ethoxy Triacrylate Monomer | | | | | | |
| TMPEOTA | — | — | — | — | — | — |
| OctylDecyl Acrylate Monomer | | | | | | |
| ODA | — | — | — | — | — | — |
| Propoxylated Glycerol Triacrylate | | | | | | |
| OTA 480 | 5.0 | 3.4 | 2.6 | 3.3 | 2.8 | 3.0 |
| 1-phenyl-2-hydroxy-2-methyl-1-propanone | | | | | | |
| DAROCUR 1173 | 4.7 | 3.3 | 2.5 | 3.1 | 2.7 | 2.9 |
| Benzophenone | 2.4 | 1.6 | 1.3 | 1.5 | 1.4 | 1.4 |
| Polydimethylsiloxane | | | | | | |
| SAG 47 | 1.2 | 0.9 | 0.7 | 0.8 | 0.7 | 0.8 |
| Tensile (PSI) | 1050 | 1100 | 1100 | 1030 | 750 | 1070 |
| Elongation (%) | 169 | 102 | 106 | 148 | 129 | 157 |
| Shore A Hardness | 85 | 84 | 83 | 78 | 75 | 81 |
| Adhesion Scratch Dry | 5 | 7 | 10 | 8.3 | 2.3 | 9.0 |
| Adhesion Scratch Coolant | 1 | 2 | 2 | 1 | 4 | 3 |
| Adhesion Scratch Oil | — | — | — | — | — | — |
| Coolant Blisters | 1 | 5 | 5 | 3 | 8.5 | 4.0 |
| Temperature Mandrel | 10 | 6 | 4.3 | 10 | 10 | 10 |
| Viscosity | 10 | 5 | 1 | 6 | 4 | 6 |

| | G | H[1] | I | J | K | L |
|---|---|---|---|---|---|---|
| Acrylated Aliphatic Urethane Oligomer | | | | | | |
| RXO 1336 | | 40.9 | 43.6 | 38.5 | 28.5 | 38.0 | 34.4 |

TABLE 1-continued

Acrylate Resin Coating Precursors (wt. %)

| | | | | | | |
|---|---|---|---|---|---|---|
| Acrylated Aromatic Urethane Oligomer | | | | | | |
| RSX 89359 | — | — | — | 14.3 | — | — |
| EBECRYL 4827 | — | — | — | 4.8 | 4.2 | — |
| Acrylated Olefinic Oligomer | | | | | | |
| CN 302 | 20.5 | — | 9.6 | — | — | — |
| FX 9005 | — | — | — | — | — | 17.2 |
| Acrylated Acrylic Oligomer | | | | | | |
| NTX 4887 (fluoro-modified) | — | — | — | — | — | — |
| Acrylated Epoxy Oligomer | | | | | | |
| EBECRYL 3708 | — | 10.9 | 19.3 | 9.5 | 8.4 | 8.6 |
| Acrylated Epoxy Monomer + Oligomer | | | | | | |
| RXO 2034 | — | — | — | — | — | — |
| Methacrylated Polyol | | | | | | |
| EBECRYL 168 | 4.1 | 8.7 | — | 5.0 | 4.5 | 3.5 |
| Isobornyl Acrylate Monomer | | | | | | |
| IBOA | 27.3 | 29.1 | 25.7 | 26.6 | 35.5 | 30.1 |
| Trimethylolpropane Ethoxy Triacrylate Monomer | | | | | | |
| TMPEOTA | — | — | — | 4.75 | — | — |
| OctylDecyl Acrylate Monomer | | | | | | |
| ODA | — | — | — | — | — | — |
| Propoxylated Glycerol Triacrylate | | | | | | |
| OTA 480 | 2.7 | 2.91 | 2.6 | — | 3.55 | 2.30 |
| 1-phenyl-2-hydroxy-2-methyl-1-propanone | | | | | | |
| DAROCUR 1173 | 2.6 | 2.76 | 2.4 | 3.8 | 3.40 | 2.18 |
| Benzophenone | 1.3 | 1.38 | 1.2 | 1.90 | 1.70 | 1.09 |
| Polydimethylsiloxane | | | | | | |
| SAG 47 | 0.7 | 0.73 | 0.6 | 0.95 | 0.84 | 0.58 |
| Tensile (PSI) | 510 | 1030 | 895 | 1150 | 670 | 1365 |
| Elongation (%) | 145 | 170 | 143 | 85 | 135 | 74.8 |
| Shore A Hardness | 72 | 75 | 73 | 84 | | 87 |
| Adhesion Scratch Dry | 7.3 | 8.0 | 1.0 | 9 | 7.5 | 7.5 |
| Adhesion Scratch Coolant | 2 | 3, 1,3 | 3 | 1 | 1 | 5.5 |
| Adhesion Scratch Oil | — | — | — | 8 | 6 | — |
| Temperature Mandrel | 10 | 10 | 10 | — | — | — |
| Coolant Blisters | 6.5 | 4.0 | 5 | — | — | — |
| Viscosity | 7 | 8 | 2 | 1 | 5 | — |

| | M | N | O | P[2] | Q[3] |
|---|---|---|---|---|---|
| Acrylated Aliphatic Urethane Oligomer | | | | | |
| RXO 1336 | 29.0 | 29.5 | 30.8 | — | 43.4 |
| Acrylated Aromatic Urethane Oligomer | | | | | |
| RSX 89359 | — | — | — | 61.5 | — |
| EBECRYL 4827 | — | — | — | — | — |
| Acrylated Olefinic Oligomer | | | | | |
| CN 302 | 16.1 | — | 17.1 | — | — |
| FX 9005 | — | 7.1 | — | — | — |
| Acrylated Acrylic Oligomer | | | | | |
| NTX 4887 (fluoro-modified) | — | 21.9 | — | — | — |
| Acrylated Epoxy Oligomer | | | | | |
| EBECRYL 3708 | 8.1 | 7.4 | 8.6 | — | 10.9 |
| Acrylated Epoxy Monomer + Oligomer | | | | | |
| RXO 2034 | — | — | 4.2 | — | — |
| Methacrylated Polyol | | | | | |
| EBECRYL 168 | 3.3 | 3.0 | 3.4 | — | 8.7 |

TABLE 1-continued

| Acrylate Resin Coating Precursors (wt. %) | | | | | |
|---|---|---|---|---|---|
| Isobornyl Acrylate Monomer | | | | | |
| IBOA | 28.2 | 25.8 | 27.0 | 29.3 | 29.0 |
| Trimethylolpropane Ethoxy Triacrylate Monomer | | | | | |
| TMPEOTA | — | — | — | 1.91 | — |
| OctylDecyl Acrylate Monomer | | | | | |
| ODA | — | — | 3.00 | — | — |
| Propoxylated Glycerol Triacrylate | | | | | |
| OTA 480 | 2.15 | 2.30 | 2.28 | — | 2.90 |
| 1-phenyl-2-hydroxy-2-methyl-1-propanone | | | | | |
| DAROCUR 1173 | 2.04 | 1.87 | 2.17 | 4.56 | 2.75 |
| Benzophenone | 1.02 | 0.94 | 1.08 | 1.14 | 1.37 |
| Polydimethylsiloxane | | | | | |
| SAG 47 | 0.54 | 0.50 | 0.57 | 1.23 | 0.73 |
| BLUE 9S79 | — | — | — | — | 0.5 |
| Tensile (PSI) | 1112 | 1028 | 640 | 2100 | 1030 |
| Elongation (%) | 122 | 80.0 | 125 | 105 | 170 |
| Shore A Hardness | 84 | 85 | 75 | 84 | 75 |
| Adhesion Scratch Dry | 7.5 | 7.5 | 8.0 | 1 | 8.0 |
| Adhesion Scratch Coolant | 3.0 | 2.0 | 2.0 | 1 | 3, 1,3 |
| Adhesion Scratch Oil | — | — | — | 6 | — |
| Temperature Mandrel | — | — | — | 8 | 10 |
| Coolant Blisters | — | — | — | 2 | 4.0 |
| Viscosity | — | — | — | 10 | 8 |

[1] Coolants tested: THERMINOL D12, DYNALENE FC-1, PF-5080 (in order shown); all other formulations tested with a 50:50 v/v mixture of GM LONG LIFE COOLANT.
[2] Contains 0.03 wt. % $Fe_3O_4$ and 0.32 wt. % $Fe_2O_3$.
$Q^3$ contains $H^1$ plus the indicated weight percentage of BLUE 9S79 as a pigment It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all articles and references, including patent applications and publications are incorporated herein by reference for all purposes.

What is claimed is:

1. An ultraviolet radiation curable coating precursor for coating an multi-layered steel gasket, the ultraviolet radiation curable coating precursor comprising:
   an acrylated aliphatic urethane oligomer;
   an acrylated epoxy oligomer;
   a mono-functional monomer for reducing viscosity of the coating precursor, said mono-functional monomer being a compound that contains one carbon—carbon double bond;
   a multi-functional monomer for increasing cross-link density, said multi-functional monomer being a compound that contains more than one carbon—carbon double bond or another chemically reactive group that can cross-link;
   an air release agent;
   an adhesion promoter; and
   a photoinitiator.

2. The ultraviolet radiation curable coating precursor of claim 1, wherein the mono-functional monomer is isobornyl acrylate monomer.

3. The ultraviolet radiation curable coating precursor of claim 1, wherein the adhesion promoter is a methacrylated polyol.

4. The ultraviolet radiation curable coating precursor of claim 1, wherein the multi-functional monomer is propoxylated glycerol triacrylate monomer.

5. The ultraviolet radiation curable coating precursor of claim 1, wherein the photoinitiator is a blend of 1-phenyl-2-hydroxy-2-methyl-1-propanone and benzophenone.

6. The ultraviolet radiation curable coating precursor of claim 1, wherein the air-release agent is a polydimethylsiloxane.

7. An ultraviolet radiation curable coating precursor for coating an multi-layered steel gasket, the ultraviolet radiation curable coating precursor comprising:
   from about 25 wt. % to about 65 wt. % of an acrylated aliphatic urethane oligomer;
   from about 5 wt. % to about 20 wt. % of an acrylated epoxy oligomer;
   from about 20 wt. % to about 40 wt. % of a mono-functional monomer for reducing viscosity of the coating precursor, said mono-functional monomer being a compound that contains one carbon—carbon double bond;
   from about 1 wt. % to about 5 wt. % of a multi-functional monomer for increasing cross-link density, said multi-functional monomer being a compound that contains more than one carbon—carbon double bond or another chemically reactive group that can cross-link;
   an air release agent;
   from about 1 wt. % to about 15 wt. % of an adhesion promoter; and
   from about 0.1 wt. % to about 10 wt. % of a photoinitiator.

8. The ultraviolet radiation curable coating precursor of claim 7, wherein the mono-functional monomer is isobornyl acrylate monomer.

9. The ultraviolet radiation curable coating precursor of claim 7, wherein the adhesion promoter is a methacrylated polyol.

10. The ultraviolet radiation curable coating precursor of claim 7, wherein the multi-functional monomer is propoxylated glycerol triacrylate monomer.

11. The ultraviolet radiation curable coating precursor of claim 7, wherein the photoinitiator is a blend of 1-phenyl-2-hydroxy-2-methyl-1-propanone and benzophenone.

12. The ultraviolet radiation curable coating precursor of claim 7, wherein the air-release agent is a polydimethylsiloxane.

* * * * *